United States Patent
Anderson et al.

[11] Patent Number: 6,044,392
[45] Date of Patent: Mar. 28, 2000

[54] METHOD AND APPARATUS FOR PERFORMING ROUNDING IN A DATA PROCESSOR

[75] Inventors: William Carroll Anderson; Thomas Joseph Tomazin, both of Austin, Tex.

[73] Assignee: Motorola, Inc., Schaumburg, Ill.

[21] Appl. No.: 08/905,764

[22] Filed: Aug. 4, 1997

[51] Int. Cl.$^7$ ............................................. G06F 7/38
[52] U.S. Cl. .................. 708/551; 708/497; 708/513
[58] Field of Search .................. 364/748.03, 748.05, 364/745.02, 748.02, 745.01; 708/551, 552, 572–574, 205, 497, 499, 513; 712/222

[56] References Cited

U.S. PATENT DOCUMENTS

| | | | |
|---|---|---|---|
| 622,650 | 4/1899 | Littlefield . | |
| 4,075,704 | 2/1978 | O'Leary | 708/507 |
| 5,208,770 | 5/1993 | Ito | 364/768 |
| 5,495,434 | 2/1996 | Taniguchi | 364/769 |
| 5,598,571 | 1/1997 | Gallup et al. | 395/8 |
| 5,623,435 | 4/1997 | Takewa et al. | 364/764 |

OTHER PUBLICATIONS

Motorola Literature Dist., DSP56000/DSP56001 Digital Signal Processor User's Manual, Rev. 2, 4.2 Data Representation and Rounding, pp. 4–8 to 4–11.
Motorola Literature Dist., DSP56000/DSP56001 Digital Signal Processor User's Manual, 6.4.2.9 Scaling Mode (Bits 10 and 11), p. 6–11.
Motorola Literature Dist., DSP56300 24–Bit Digital Signal Processor Family Manual, 3.2.2 Rounding Modes, pp. 3–8 to 3–10.
Motorola Literature Dist., Motorola's High Performance DSP Tech., DSP56800 Family Manual, 3.5 Rounding, pp. 3–37 to 3–41.
Motorola Literature Dist., Motorola's High Performance DSP Tech., DSP56800 Family Manual, MACR Multiply–Accumulate and Round, pp. A–119 to A–120.
Motorola Literature Dist., Motorola's High Performance DSP Tech., DSP56800 Family Manual, MPYR Signed Multiply and Round, pp. A–144 to A–145.
Motorola Literature Dist., Motorola's High Performance DSP Tech., DSP56800 Family Manual, RND Round Accumulator, pp. A–168 to A 169.
Motorola Literature Dist., Motorola PowerPC 603 RISC Microprocessor User's Manual, 3.1.5 Rounding, pp. 3–10 to 3–17.

Primary Examiner—John A. Follansbee
Attorney, Agent, or Firm—Susan C. Hill

[57] ABSTRACT

A method and apparatus for performing rounding in a data processor (10). In one embodiment, two instructions are used to implement a procedure for rounding operands of finite but arbitrary precision. A first instruction "rndp" performs a preliminary rounding operation by analyzing bits which are less significant than the rounding point and updating the values of the round (RND) and sticky (STK) status bits (70, 71) in a defined manner. A second instruction "rnd" performs the rounding of the most significant portion of the operand, using the contents of the RND and STK status bits (70, 71) as determined by the one or more iterations of the "rndp" instruction. By appropriate use of these two instructions, and additional add-with-carry operations, an operand of any length may be rounded at an arbitrary point using a data processor (10) with fixed width registers (40) and a fixed width ALU (30).

12 Claims, 3 Drawing Sheets

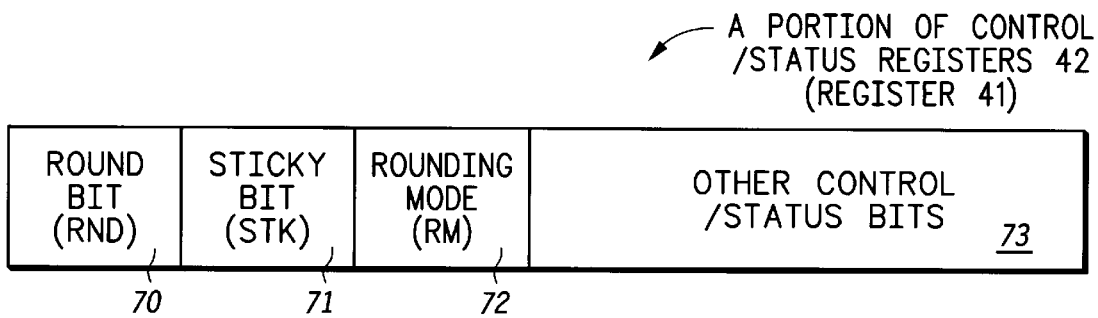

FIG.3

| RNDP | PRELIMINARY ROUND |
|---|---|
| SYNTAX/OPCODE | RNDP reg                 1001 0011 0010 ssss |
| DESCRIPTION | UPDATES THE VALUE OF THE RND BIT 70 AND THE STK BIT 71 BASED ON THEIR CURRENT CONTENTS AND THE CONTENTS OF reg<br><br>$STK_{NEW} = STK_{OLD} | RND_{OLD} | (((1<<(N-1))-1 \ \& \ reg)\mathrel{!}=0);$<br>$RND_{NEW} = (1<<(N-1) \ \& \ reg)\mathrel{!}=0;$<br>WHERE N=NUMBER OF BITS IN reg |

FIG.4

| RND | ROUND |
|---|---|
| SYNTAX/OPCODE | RND reg                1001 0011 0001 dddd |
| DESCRIPTION | ROUNDS reg ACCORDING TO THE ROUNDING MODE (RM) BIT 72, AND UPDATES CONDITION CODE BITS<br>IF RM = 0<br>    reg += RND & (STK | reg & 1);<br>IF RM = 1<br>    reg += RND; |
| EXIT CONDITION | RND BIT 70 AND STK BIT 71 ARE BOTH CLEARED |

FIG.5

METHOD AND APPARATUS FOR PERFORMING ROUNDING IN A DATA PROCESSOR

FIELD OF THE INVENTION

The present invention relates to a data processor, and more particularly to a method and apparatus for performing rounding in a data processor.

BACKGROUND OF THE INVENTION

Rounding is a common technique used in digital signal processing and floating point arithmetic computations performed by data processors. Rounding is often used to minimize error where a computation generates more bits of precision than can be easily stored by the data processor. Prior art data processors generally perform a rounding operation directly on the result of an arithmetic computation as part of execution of the arithmetic instruction itself.

A problem arises when it is necessary to perform precise computations on operands which are wider than the width of the arithmetic logic unit and registers in the data processor. A technique was required to allow rounding of wide operands, while preferably allowing the rounding point to be flexible, and while preferably utilizing as little circuitry as possible.

BRIEF DESCRIPTION OF THE DRAWINGS

FIG. 3 illustrates, in block diagram form, a portion of control/status registers 42 of FIG. 2 in accordance with one embodiment of the present invention;

FIG. 4 illustrates, in tabular form, an instruction for performing preliminary rounding in accordance with one embodiment of the present invention;

FIG. 5 illustrates, in tabular form, an instruction for performing rounding in accordance with one embodiment of the present invention.

DESCRIPTION OF THE PREFERRED EMBODIMENT

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Description of the Figures

Figure 1:
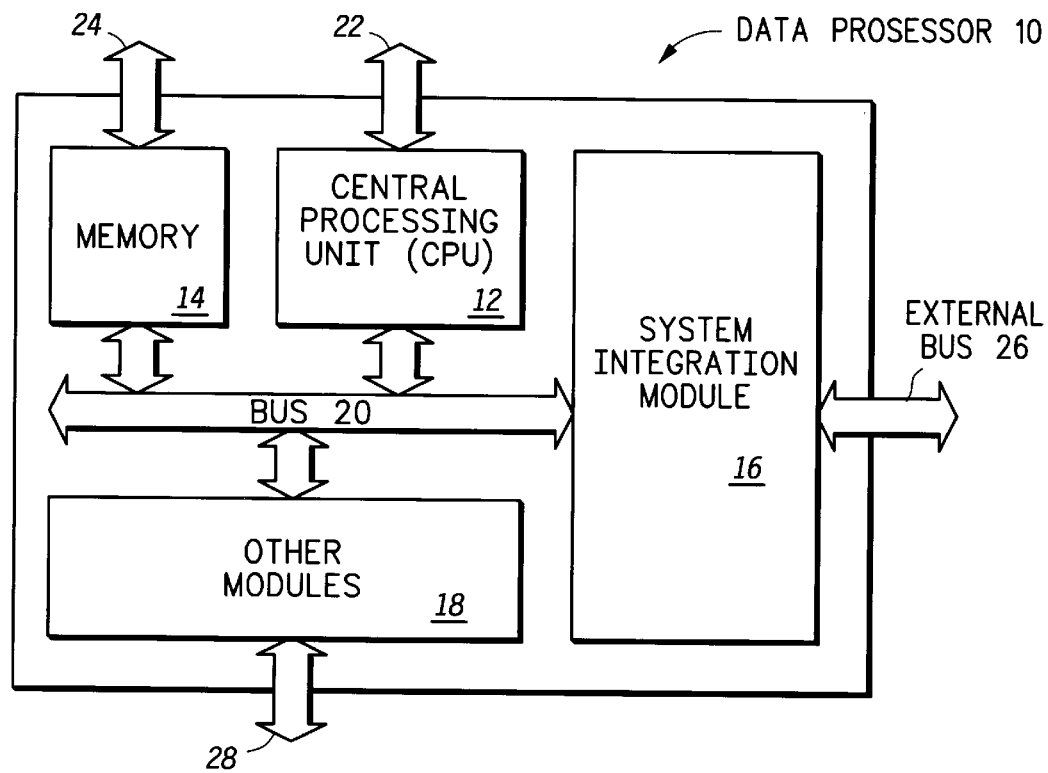
FIG. 1 illustrates, in block diagram form, a data processor 10 in accordance with one embodiment of the present invention.

FIG. 1 illustrates a data processor 10. In one embodiment, data processor 10 includes a central processing unit (CPU) 12, memory 14, system integration module 16, and other modules 18, which are all bi-directionally coupled to each other by way of bus 20. System integration module 16 may be coupled external to data processor 10 by way of external bus 26. Other modules 18 are optionally be coupled external to data processor 10 by way of one or more integrated circuit terminals 28. Memory 14 is optionally coupled external to data processor 10 by way of one or more integrated circuit terminals 24. Central processing unit 12 is optionally coupled external to data processor 10 by way of one or more integrated circuit terminals 22.

Still referring to FIG. 1, alternate embodiments of the present invention may use any type of structure for data processor 10. In addition, data processor 10 may perform a wide variety of functions. For example, data processor 10 may use a RISC (Reduced Instruction Set Computer) architecture, may use a Harvard architecture, may be a vector processor, may be a SIMD (Single Instruction Multiple Data) processor, may perform floating point arithmetic, may perform digital signal processing computations, etc.

Figure 2:
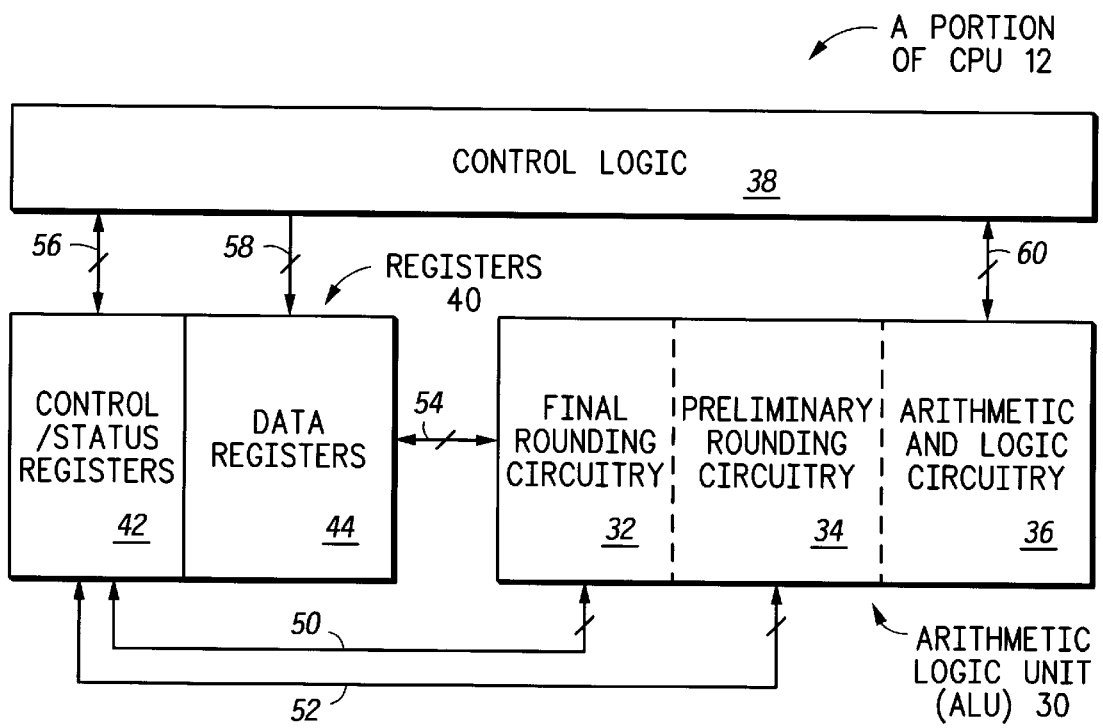
FIG. 2 illustrates, in block diagram form, a portion of CPU 12 of FIG. 1 in accordance with one embodiment of the present invention.

FIG. 2 illustrates one embodiment of a portion of central processing unit (CPU) 12. In the illustrated embodiment, CPU 12 includes control logic 38, arithmetic logic unit (ALU) 30, and registers 40. Note that alternate embodiments of the present invention may use an arithmetic unit (AU) in place of arithmetic logic unit 30. In one embodiment, arithmetic logic unit 30 includes arithmetic and logic circuitry 36, preliminary rounding circuitry 34, and final rounding circuitry 32. In one embodiment of the present invention, registers 40 include control/status registers 42 and data registers 44. Data registers 44 are bi-directionally coupled to ALU 30 by way of a plurality of conductors 54. Control/status registers 42 are bi-directionally coupled to final rounding circuitry 32 by way of a plurality of conductors 50. Control and status registers 42 are bi-directionally coupled to preliminary rounding circuitry 34 by way of a plurality of conductors 52. Control logic 38 is bi-directionally coupled to control/status registers 42 by way of conductors 56 in order to receive and provide control and status information. Control logic 38 is coupled to data registers 44 by way of conductors 58 in order to provide control information. Control logic 38 is bi-directionally coupled to arithmetic logic unit 30 by way of a plurality of conductors 60 in order to receive and provide control and status information.

FIG. 3 illustrates one embodiment of a portion of control/status registers 42. In one embodiment, the illustrated portion of control/status registers 42 is implemented as a single register 41. In one embodiment, register 41 includes a round bit (RND) 70, a sticky bit (STK) 71, a rounding mode bit (RM) 72, and other control/status bits 73. Note that alternate embodiments of the present invention may locate bits 70–72 in different registers or in the same register. In addition, the functionality of one or more of bits 71–72 may be encoded into fewer bits, or the functionality of one or more of bits 71–72 may be combined with other control/status bits and encoded into fewer or more bits.

FIG. 4 illustrates the mnemonic, syntax, opcode and description, including a pseudo-C code equivalent operation, for a data processing instruction which implements a preliminary round operation.

FIG. 5 illustrates the mnemonic, syntax, opcode and description, including a pseudo-C code equivalent operation, for a data processing instruction which implements a round operation.

Figure 6:
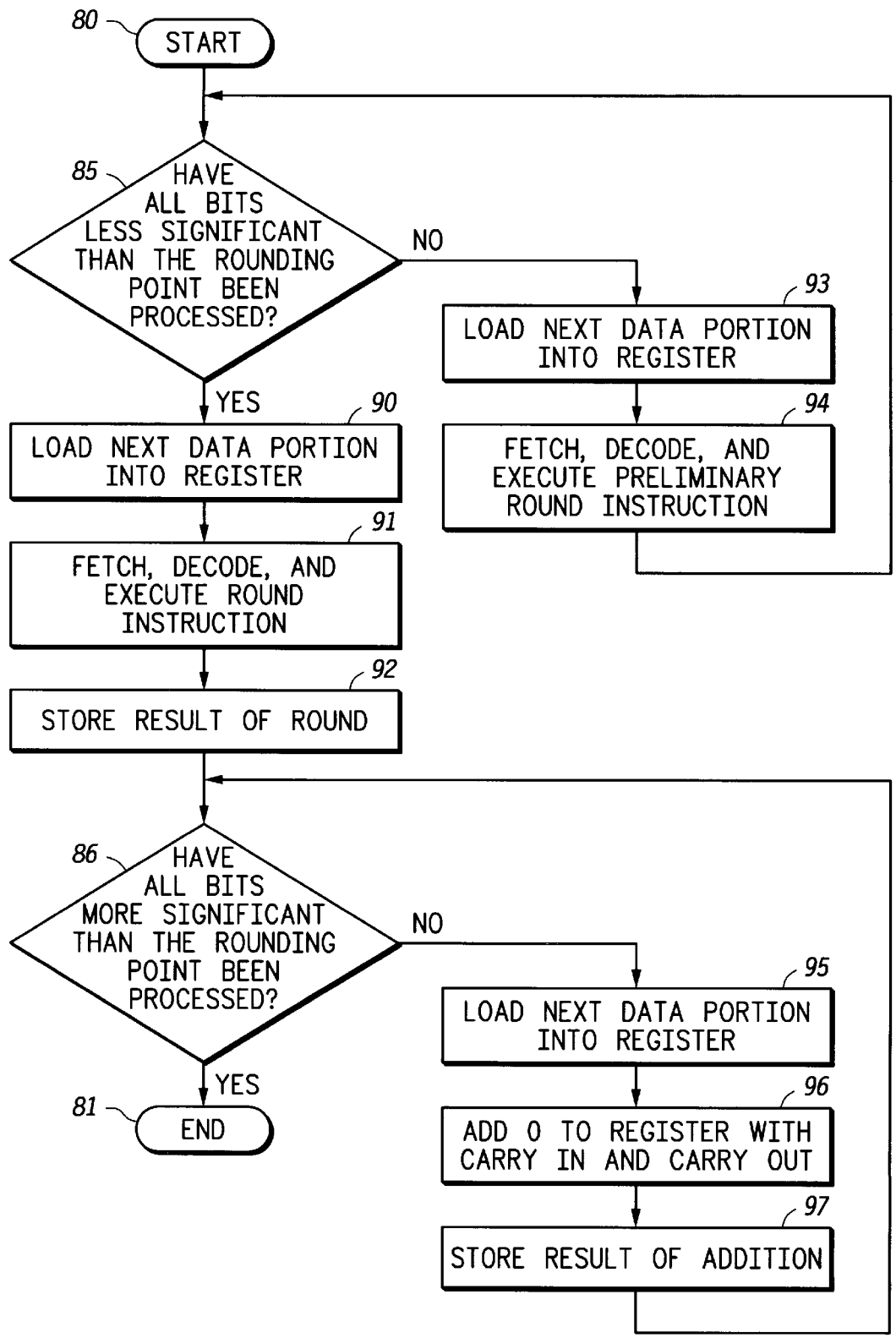
FIG. 6 illustrates, in flow diagram form, a process for performing rounding in a data processor.

FIG. 6 illustrates a method for performing rounding on the Mth bit of a data value having N bits, where the width of the arithmetic logic unit and registers is less than N, and where the user determines the location of the Mth bit.

Operation of the Preferred Embodiment

The operation of the present invention will now be described. FIG. 6 illustrates a method that may be used to perform rounding in a data processor. The method illustrated in FIG. 6 is particularly useful for performing rounding on operands whose precision exceeds the size of the arithmetic logic unit 30 and registers 40 within a processing unit 12 (see FIG. 2). In other word, the method illustrated in FIG. 6 may be used to perform rounding on operands which have a number of bits (N), where N is any finite integer number; and, the method is particularly useful for performing rounding when the size of the arithmetic logic unit 30 and registers 40 is less than N bits. As an example, if size or width of arithmetic logic unit 30 and register s 40 is 16 bits, the methodology illustrated in FIG. 6 is particularly useful for performing rounding on operands having more than 16 bits.

Note that the method illustrated in FIG. 6 allows a user of data processor 10 (see FIG. 1) to determine where the rounding point will be within the N bit operand to be rounded. This determination is made by the user before the flow is started at oval 80. The rounding point may be determined by selectively shifting portions of the operand using shift circuitry within ALU 30 (located in circuitry 32, 34, or 36) or by selectively shifting portions of the operand using separate shift circuitry located elsewhere in CPU 12.

Referring to FIG. 6, oval 80 is the starting point of the flow or method. At decision diamond 85, a check is made to determine whether all bits less significant than the rounding point have been processed. It is important to note that the rounding point may be selected to be any bit position from 0 to N in an N-bit operand. If the answer to decision diamond 85 is "NO", the flow proceeds to step 93 where the next least significant data portion of the operand is loaded into a register. The flow then proceeds to step 94 where the preliminary round instruction is fetched, decoded and executed using the register as the operand. Note that FIG. 4 illustrates one possible embodiment of an instruction which performs a preliminary round operation.

Still referring to FIG. 6, after the completion of step 94, the flow continues back to decision diamond 85 where again a check is made to determine if all bits less significant than the rounding point have been processed. If the answer to decision diamond 85 is "YES", the flow continues to step 90 where the next least significant data portion of the operand is loaded into the register. An alternate embodiment of the present invention may operate on an accumulator which is wider than a normal data register to hold the operand for the round instruction. The flow then continues to step 91 where a rounding instruction is fetched, decoded and executed. FIG. 5 illustrates one possible embodiment of an instruction which implements a rounding operation. In FIG. 5, the register "reg" used as the source and destination may alternately be an accumulator within data processor 10.

The flow then proceeds from step 91 to step 92 where the result of the rounding operation is stored in a location other than the register. From step 92, the flow proceeds to decision diamond 86, which determines if all of the bits more significant than the rounding point have been processed. If the answer to decision diamond 86 is "NO", the flow continues to step 95 where the next least significant data portion is loaded into the register. The flow then proceeds to step 96 where the value 0 is added to the register with a carry in and a carry out. The flow then proceeds to step 97 where the result of the addition is stored in a location other than the register. From step 97 the flow returns back to decision diamond 86. At decision diamond 86, it is again determined whether all the bits more significant than the rounding point have been processed. If they have, i.e. the answer is "YES", the flow proceeds to oval 81 where the process finishes or ends.

Note that the flow illustrated between ovals 80 and 81 of FIG. 6 illustrates a method and process that may be used to implement rounding on an operand having N number of bits, where N is a finite integer, and where the rounding may be performed on any bit location of that operand. In addition, the rounding may be performed using a data processor 10 (see FIG. 1) which has a data width less than N, where the data width of the data processor 10 is determined by the data width or size of the arithmetic logic unit 30 and registers 40 (see FIG. 2).

FIGS. 4 and 5 illustrate instructions which may be used to perform rounding operations. Referring first to FIG. 4. FIG. 4 illustrates one possible instruction that may be used to implement a preliminary rounding operation. The term "preliminary" is used to indicate that this rounding operation is performed on the bits which are to be analyzed and discarded and not kept as part of the final result. Note that these discarded bits include all bits less significant than the rounding point selected by the user. In one embodiment of the present invention this preliminary rounding instruction has the mnemonic "rndp" which stands for "round preliminary" or "preliminary round instruction".

In one embodiment, the preliminary round instruction indicates a source register located in data registers 44 which contains the portion of the operand to be processed with the rounding operation. Alternate embodiments of the present invention may provide the operand in alternate ways, such as a pointer to one or memory locations, directly as part of the instruction itself, etc. Note that in one embodiment, there is no data result produced as a result of the preliminary round operation. Instead, the preliminary round operation affects the round bit 70 and the sticky bit 71 in the manner described by the C-code listed under the description in FIG. 4.

As a result of executing the preliminary round instruction illustrated in FIG. 4, the round bit 70 receives and stores the most significant bit below the rounding point of the operand portion located in the source register. Similarly, as a result of the preliminary rounding operation performed by the instruction illustrated in FIG. 4, the sticky bit 71 receives and stores the value which is computed using the old sticky bit value, the old round bit value, and the result of an ORing operation performed on the N−1 least significant bits of the portion of the data operand stored in the source register.

The manner in which this instruction is implemented may be described by reference to FIG. 2. In one embodiment of the present invention, arithmetic logic unit 30 includes preliminary rounding circuitry 34. Preliminary rounding circuitry 34 receives the old sticky bit from sticky bit 71 located in control/status registers 42 by way of conductors 52. Preliminary rounding circuitry 34 performs the ORing computation on the least significant N−1 bits of the data portion stored in the source register by receiving this value from data registers 44 across conductors 54. Thus, preliminary rounding circuitry 34 logically ORs the N−1 least significant bits of the data portion from the source register with the old value of the round bit received across conductors 52, and with the old value of the sticky bit received across conductors 52. In order to determine the new value for round bit 70, preliminary rounding circuitry 34 transfers the most significant bit of the data portion from the source register to round bit 70 by way of conductors 52.

FIG. 5 illustrates one possible embodiment of an instruction for performing a rounding operation. In one embodiment, the mnemonic for this instruction is "rnd". In the illustrated embodiment, this rounding instruction requires a destination register which is also used as the source register. Note that alternate embodiments of the present invention may use different registers for the source and destination. Alternate embodiments of the present invention may provide the operand in alternate ways, (e.g. a pointer to one or memory locations, directly as part of the instruction itself, etc.) and may indicate the destination location for the result in a variety of ways (e.g. a register specifier, a pointer to one or memory locations, etc.).

Note that in one embodiment of the present invention, the round instruction performs different steps based on the rounding mode or modes selected by the rounding mode (RM) bit 72. The use of the rounding mode bit 72 allows the user to select the type of rounding which is performed. In one embodiment of the present invention, the RM bit 72 is used to select whether the rounding operation is biased or unbiased. Note that the term "biased" indicates that the rounding is to the nearest or two's compliment, and the term "unbiased" is used to indicate that the rounding is performed to the nearest even or is convergent. Alternate embodiments of the present invention may not use a rounding mode bit 72, or may use different rounding modes defined by one or more rounding mode bits.

Still referring to FIG. 5, in one embodiment of the present invention, if the rounding mode bit 72 is cleared to 0, and thus the unbiased rounding mode is selected, then the destination register stores the value as described by the C-code illustrated in FIG. 5. Similarly, if the rounding mode bit 72 is set to a 1, then the destination register stores the value again described by the alternate C-code in FIG. 5. In more detail, if the RM bit 72 is cleared to 0 then the following operation is performed. If the least significant bit of the data portion stored in the source register is a 1, or the sticky bit is a 1, and the round bit is a 1, then 1 is added to the data portion stored in the source register. Note that the source register is also used as the destination register in this case. If the round mode bit is set to 1, then the value of the round bit is added to the data portion stored in the source register. Again, note that the destination and the source register are the same. In alternate embodiments, the result of the conditional "add 1 to the source register" operation may be stored in the destination register, rather than being stored back into the source register. Using a separate destination register would prevent overwriting of the data portion stored in the source register. Note that in some embodiments of the present invention, both the round bit 70 and the sticky bit 71 are cleared as a result of executing the round instruction. Alternate embodiments of the present invention may provide a rounding instruction which affects the round bit 70 and the sticky bit 71 in a different manner, including having no effect.

Referring now to FIG. 2, one possible implementation of the instruction illustrated in FIG. 5 will now be discussed. Referring to FIG. 2, final rounding circuitry 32 is used during execution of the rounding instruction illustrated in FIG. 5. Final rounding circuitry 32 receives the old values from the round bit 70 and the sticky bit 71 from control/status registers 42 by way of conductors 50. Final rounding circuitry 32 receives the data portion of the operand from one of data registers 44 by way of conductors 54. Note that in one embodiment of the present invention final rounding circuitry 32 performs the logical operation of ORing the least significant bit of the data portion from registers 44 with the old sticky bit value and then logically ANDing the result with the old round bit value and providing this bit to arithmetic and logic circuitry 36 so that an add operation may be performed using the data portion from registers 44 and the result of the logical operation from final rounding circuitry 32.

Alternate embodiments of the present invention may clear the round bit 70 and the sticky bit 71 in a variety of manners. In one implementation, final rounding circuitry 32 may perform the clearing function and transfer the cleared values back to control/status registers 42 by way of conductors 50. In an alternate embodiment, control logic 38 is able to determine from the opcode of the rounding instruction that the round bit 70 and sticky bit 71 are to be cleared once their old values have been provided to final rounding circuitry 32 by way of conductors 50. In one embodiment of the present invention, control logic 38 includes fetch circuitry (not shown) which may be used to fetch instructions from memory 14 by way of bus 20 or which may be used to fetch instructions external to data processor 10 by way of external buses 26 and 20. Control logic 38 may also include decode circuitry (not shown) which may be used to decode the opcode of the rounding instructions in order to provide the proper control circuitry to registers 40 and arithmetic logic unit 30.

While the present invention has been illustrated and described with reference to specific embodiments, further modifications and improvements will occur to those skilled in the art. It is to be understood, therefore, that this invention is not limited to the particular forms illustrated and that it is intended in the appended claims to cover all modifications that do not depart from the spirit and scope of this invention.

What is claimed is:

1. A method of performing rounding on an operand with arbitrary finite precision using a data processor with a fixed operand width, said method comprising:

selecting a selected rounding point from a plurality of possible rounding points;

performing a preliminary rounding function by repeating a preliminary rounding step until all bits less significant than the selected rounding point have been processed;

performing a rounding function by executing a rounding step; and performing a post-rounding function by repeating a post-rounding step until all bits more significant than the selected rounding point have been processed, wherein the preliminary rounding step comprises:

reading a first portion of the operand into a first data register, and executing a preliminary round instruction on the first data register, wherein:

the preliminary round instruction utilizes contents of a sticky bit, a round bit, and the first data register to set the sticky bit and the round bit.

2. The method in claim 1, further comprising a step of:

testing a rounding mode bit to determine which of a plurality of rounding modes to utilize in performing the rounding function.

3. The method in claim 1 wherein the rounding step comproses:

reading a second portion of the operand into a second data register, and executing a round instruction on the second data register, wherein:

the round instruction utilizes contents of the sticky bit, the round bit, and the second data register to round contents of the second data register and generate a carry out result, and storing a result from the round instruction from the second data register.

4. The method in claim 1 wherein the post-rounding step comprises:

reading a second portion of the operand into a second data register, adding zero to the second portion of the operand in the second data register with carry-in and carry-out as an addition, and storing a result from the addition.

5. The method in claim 1 wherein: the rounding step comprises:

reading a second portion of the operand into a second data register, and executing a round instruction on the second data register, wherein:

the round instruction utilizes contents of the sticky bit, the round bit, and the second data register to round contents of the second data register and to generate a carry-out status, and storing a result from the round instruction from the second data register; and the post-rounding step comprises:

reading a third portion of the operand into a third data register, adding zero to the third portion of the operand in the third data register with carry-in and carry-out as an addition, and storing a result from the addition.

6. A data processor for performing rounding on an operand with arbitrary finite precision, said data processor comprising:

a data register of a fixed operand width for containing a portion of the operand;

a control register containing a sticky bit and a round bit;

a preliminary rounding circuit coupled to the data register and the control register that receives the sticky bit, the round bit, and the portion of the operand in the data register as inputs and generates the sticky bit and the round bit as outputs; and an arithmetic logical unit coupled to the data register and the control register that performs rounding in response to the portion of the operand in the data register, the sticky bit, and the round bit.

7. The data processor in claim 6 which further comprises:

a carry bit.

8. The data processor in claim 6 which further comprises:

control logic to control execution of the arithmetic logical unit and the preliminary rounding circuit.

9. A data processor for performing rounding on an operand with arbitrary finite precision, said data processor comprising:

a data register of a fixed operand width for containing a portion of the operand;

a control register containing a sticky bit and a round bit;

an arithmetic logical unit coupled to the data register and the control register that performs a rounding of data in the data register in response to the portion of the operand in the data register, the sticky bit, and the round bit; and control logic to control execution of the arithmetic logical unit.

10. The data processor in claim 9 wherein a rounding point is selectable rather than fixed.

11. The data processor in claim 9 wherein:

the arithmetic logical unit additionally provides a carry bit at completion of the rounding.

12. The data processor in claim 9 wherein:

the control register also contains a rounding mode bit, and one of a plurality of rounding modes for the rounding performed by the arithmetic logical unit is selected by the rounding mode bit.

* * * * *